(12) United States Patent
Hiraoka (10) Patent No.: US 11,052,865 B2
(45) Date of Patent: Jul. 6, 2021

(54) GAS GENERATOR

(71) Applicant: NIPPON KAYAKU KABUSHIKI KAISHA, Chiyoda-ku (JP)

(72) Inventor: Masaki Hiraoka, Himeji (JP)

(73) Assignee: NIPPON KAYAKU KABUSHIKI KAISHA, Chiyoda-ku (JP)

(*) Notice: Subject to any disclaimer, the term of this patent is extended or adjusted under 35 U.S.C. 154(b) by 57 days.

(21) Appl. No.: 16/338,177

(22) PCT Filed: Apr. 18, 2017

(86) PCT No.: PCT/JP2017/015542
§ 371 (c)(1),
(2) Date: Mar. 29, 2019

(87) PCT Pub. No.: WO2018/078916
PCT Pub. Date: May 3, 2018

(65) Prior Publication Data
US 2020/0023805 A1    Jan. 23, 2020

(30) Foreign Application Priority Data

Oct. 28, 2016 (JP) .............................. JP2016-211927

(51) Int. Cl.
*B60R 21/264* (2006.01)
*F42B 3/04* (2006.01)

(52) U.S. Cl.
CPC .............. *B60R 21/264* (2013.01); *F42B 3/04* (2013.01)

(58) Field of Classification Search
CPC ... B60R 21/26; B60R 21/264; B60R 21/2644; F42B 3/04; F42B 3/10; F42B 3/12
(Continued)

(56) References Cited

U.S. PATENT DOCUMENTS 3,401,826 A    9/1968 Anthony
3,452,897 A *  7/1969 Anthony ............... B21D 51/34
                                           220/619
(Continued)

FOREIGN PATENT DOCUMENTS

CN    109070834 A    12/2018
DE    112017005445 T5 *  8/2019 ........... B60R 21/264
(Continued)

OTHER PUBLICATIONS

International Search Report dated May 30, 2017 in PCT/JP2017/015542 filed on Apr. 18, 2017.
(Continued)

*Primary Examiner* — James S Bergin
(74) *Attorney, Agent, or Firm* — Oblon, McClelland, Maier & Neustadt, L.L.P.

(57) ABSTRACT

A gas generator includes a housing and a gastight container which accommodates a gas generating agent. The gastight container includes a cup body and a cover body. The cover body includes a bottom portion and a fold-over portion which covers an opening end of the cup body. The cover body is fixed to the cup body by providing, in the fold-over portion in a portion covering an outer circumferential surface of the opening end of the cup body, a first swaging portion in a portion of the fold-over portion which corresponds to a sidewall portion of the cup body and defines a gas generating agent accommodation chamber at a position adjacent to the bottom portion and a second swaging portion in a portion opposed to a portion of the fold-over portion which covers an inner circumferential surface of the opening end of the cup body.

4 Claims, 4 Drawing Sheets

(58) Field of Classification Search
USPC .............. 102/202.14, 530, 531; 280/741, 736
See application file for complete search history.

(56) References Cited

U.S. PATENT DOCUMENTS

| | | | |
|---|---|---|---|
| 5,756,928 | A | 5/1998 | Ito et al. |
| 5,847,310 | A | 12/1998 | Nagahashi et al. |
| 8,573,644 | B1 | 11/2013 | Mayville et al. |
| 9,114,410 | B1 | 8/2015 | Mayville et al. |
| 2011/0265678 | A1* | 11/2011 | Sasamoto ............ B60R 21/2644 102/530 |
| 2012/0042801 | A1* | 2/2012 | Sasamoto ................ C06D 5/06 102/530 |
| 2012/0048137 | A1* | 3/2012 | Hagihara ................. C06D 5/06 102/530 |
| 2017/0210333 | A1 | 7/2017 | Imai et al. |

FOREIGN PATENT DOCUMENTS

| | | | |
|---|---|---|---|
| JP | 7-232613 | A | 9/1995 |
| JP | 2015-151010 | A | 8/2015 |
| JP | 2016-22930 | A | 2/2016 |

OTHER PUBLICATIONS

Combined Chinese Office Action and Search Report dated Dec. 2, 2020 in Chinese Patent Application No. 201780066860.7 (with English translation of Office Action only), citing document AO therein, 12 pages.

* cited by examiner

GAS GENERATOR

TECHNICAL FIELD

The present invention relates to a gas generator incorporated in an air bag apparatus as a passenger protection apparatus equipped in a car and the like, and particularly to what is called a cylinder type gas generator having an elongated columnar outer geometry that is suitably incorporated into a side air bag apparatus and the like.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with the air bag serving as a cushion by instantaneously expanding and developing the air bag at the time of collision of a vehicle.

A gas generator is equipment which is incorporated in this air bag apparatus, an igniter therein being ignited in response to power feed through a control unit at the time of collision of a vehicle to thereby burn a gas generating agent with flame caused by the igniter and instantaneously generate a large amount of gas, and thus expands and develops an air bag.

Depending on a position of installation in a vehicle and the like or on specifications such as output, gas generators of various constructions are available. A gas generator called a cylinder type gas generator represents one example. The cylinder type gas generator has an outer geometry in an elongated columnar shape and it is suitably incorporated in a side air bag apparatus, a curtain air bag apparatus, a knee air bag apparatus, or a seat cushion air bag apparatus.

Normally, in a cylinder type gas generator, an igniter is installed at one end portion in an axial direction of a housing, a combustion chamber accommodating a gas generating agent is provided on a side of the one end portion, a filter chamber accommodating a filter is provided on a side of the other end portion in the axial direction of the housing, and a gas discharge opening is provided in a circumferential wall portion of the housing in a portion defining the filter chamber.

In the cylinder type gas generator thus constructed, gas generated in the combustion chamber flows into the filter chamber along the axial direction of the housing and passes through the filter, and the gas which has passed through the filter is discharged to the outside through the gas discharge opening.

In general, in a gas generator, it is important that a gas generating agent is hermetically sealed from the outside, because desired gas output may not be obtained when the gas generating agent absorbs moisture.

A method of accommodating a gas generating agent in a gastight container formed from a relatively weak member which melts or bursts with heat or a pressure generated by activation of an igniter and arranging the gastight container in the housing is available as a method of preventing the gas generating agent from absorbing moisture in a cylinder type gas generator. A cylinder type gas generator in accordance with this method is disclosed, for example, in FIGS. 1 to 11 of Japanese Patent Laying-Open No. 2016-22930 (PTL 1).

In the gas generator disclosed in Japanese Patent Laying-Open No. 2016-22930, the gastight container is constituted of a cylindrical cup body with bottom which has an opening end and a cover body which closes the opening end of the cup body. Various methods such as brazing, adhesion, welding, and tightening by winding are available for joint between the cup body and the cover body.

CITATION LIST

Patent Literature

PTL 1: Japanese Patent Laying-Open No. 2016-22930

SUMMARY OF INVENTION

Technical Problem

When a gastight container is formed of a cup body and a cover body made from a relatively weak member as described above and they are joined with each other simply with brazing, adhesion, welding, and tightening by winding without any devisal, strength of the joint portion is not sufficiently high and the gastight container may break due to application of external force to the joint portion in assembly. Therefore, sealing performance may consequently lower.

Therefore, the present invention was made in view of the problems described above, and an object thereof is to provide a gas generator capable of maintaining high performance of sealing a gas generating agent with a simplified construction and thus obtaining desired gas output.

Solution to Problem

A gas generator based on the present invention includes a housing, a gas generating agent, an igniter, and a gastight container. The housing is formed from an elongated cylindrical member having axial one and the other end portions closed and having a circumferential wall portion. The gas generating agent is accommodated in the housing. The igniter is assembled to the one end portion of the housing and serves to burn the gas generating agent. The gastight container is arranged in the housing, defines a gas generating agent accommodation chamber where the gas generating agent is accommodated, and melts or bursts with heat or a pressure generated by activation of the igniter. The gastight container includes a cup body and a cover body, the cup body including a cylindrical sidewall portion arranged substantially coaxially with the housing and a top wall portion which closes one axial end portion of the sidewall portion, the cover body being attached to an opening end which is the other axial end portion of the cup body. The cover body includes a bottom portion in a form of a flat plate and a fold-over portion, the bottom portion being located in the cup body by being inserted in the opening end of the cup body and defining the gas generating agent accommodation chamber together with the cup body, the fold-over portion extending from a circumferential edge of the bottom portion and being at least partly curved to cover an inner circumferential surface, an end surface, and an outer circumferential surface of the opening end of the cup body. The gastight container is accommodated in the housing such that the bottom portion of the cover body faces the igniter. In the gas generator based on the present invention, the cover body is fixed to the cup body by providing, in a portion of the fold-over portion which covers the outer circumferential surface of the opening end of the cup body, a first swaging portion formed by decreasing a diameter of the fold-over portion radially inward and a second swaging portion formed by decreasing a diameter of the fold-over portion radially inward, the first swaging portion being provided in a portion of the fold-over portion which corresponds to the sidewall portion of the cup body and defines the gas generating agent accommodation chamber at a position adjacent to the bottom portion, the second swaging portion being provided in a portion of the fold-over portion which is opposed to a portion of the fold-over portion which covers the inner circumferential surface of the opening end of the cup body.

The gas generator based on the present invention may further include a filter and a partition member. Gas generated as a result of burning of the gas generating agent passes through the filter. The partition member partitions a space in the housing in an axial direction such that a combustion chamber where the gastight container is accommodated is located on a side of the one end portion of the housing and a filter chamber where the filter is accommodated is located on a side of the other end portion of the housing. In that case, a gas discharge opening for emitting the gas to the outside is preferably provided in the circumferential wall portion of the housing in a portion defining the filter chamber.

In the gas generator based on the present invention, a heat insulating layer is preferably provided between the circumferential wall portion of the housing and the sidewall portion of the cup body.

In the gas generator based on the present invention, the partition member is preferably formed from a cylindrical member with bottom. In that case, preferably, the heat insulating layer is provided by positioning the gastight container with respect to the housing by inserting an end portion of the gastight container on a side of the filter chamber in the partition member and loosely fitting an end portion of the gastight container on a side of the igniter in the housing.

In the gas generator based on the present invention, the gastight container may be biased toward the partition member by arranging an elastic body as abutting on the one end portion of the housing and the fold-over portion of the cover body.

In the gas generator based on the present invention, the elastic body is preferably a coil spring.

In the gas generator based on the present invention, preferably, a portion of the cover body which forms the fold-over portion is greater in thickness than a portion of the cup body which forms the sidewall portion.

Advantageous Effects of Invention

According to the present invention, a gas generator capable of maintaining high performance of sealing a gas generating agent with a simplified construction and thus obtaining desired gas output can be obtained.

DESCRIPTION OF EMBODIMENTS

An embodiment of the present invention will be described hereinafter in detail with reference to the drawings. An embodiment shown below represents application of the present invention to a cylinder type gas generator incorporated in a side air bag apparatus. The same or common elements in an embodiment shown below have the same reference characters allotted in the drawings and description thereof will not be repeated.

Figure 1:
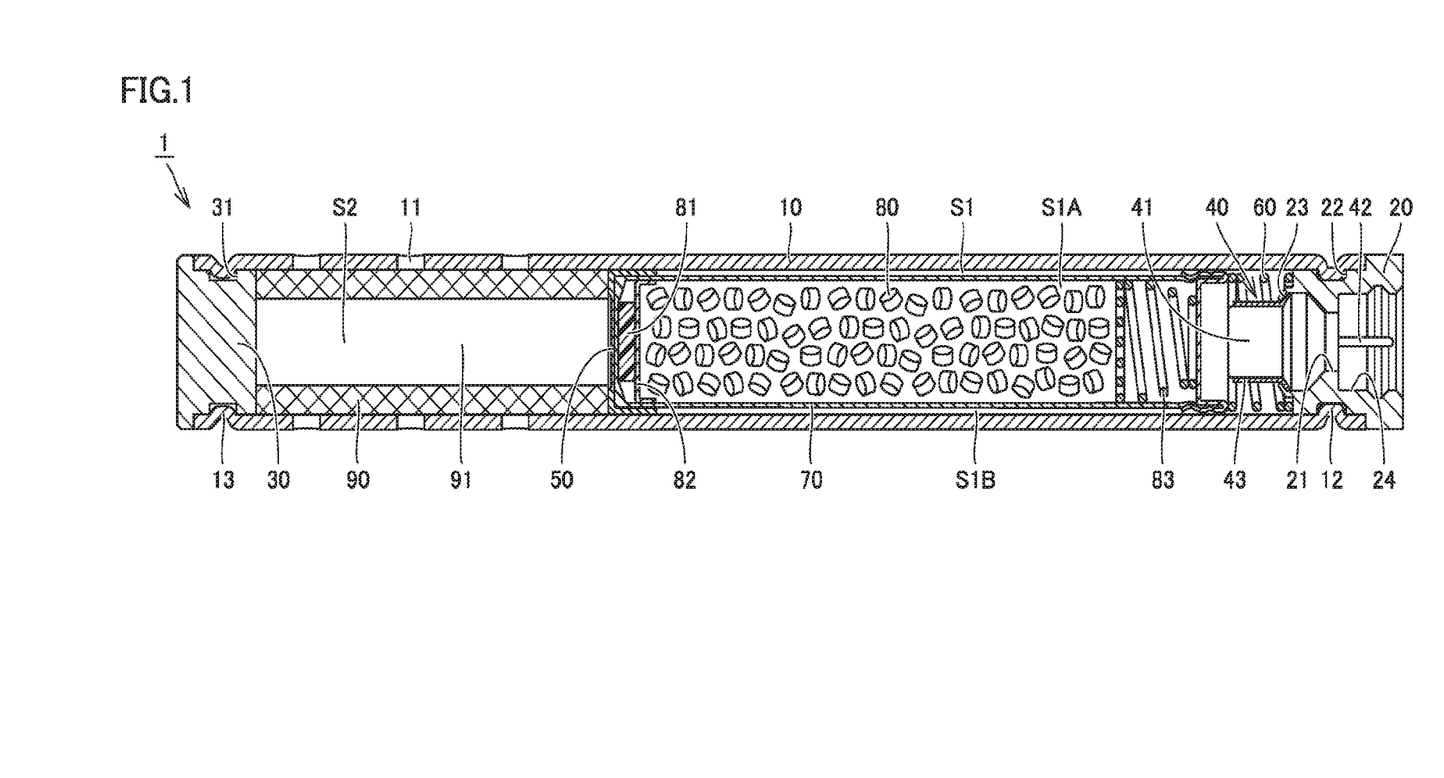
FIG. 1 is a schematic diagram of a cylinder type gas generator in an embodiment of the present invention.
Figure 2:
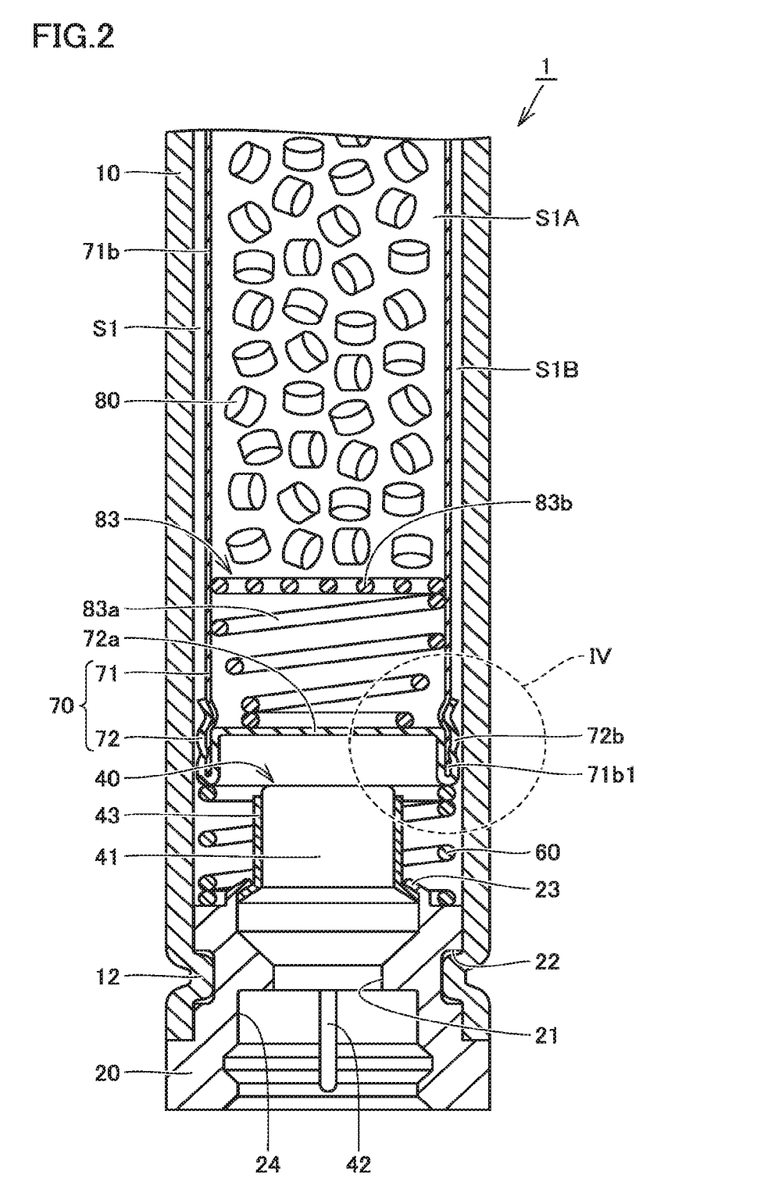
FIG. 2 is an enlarged cross-sectional view of a portion in the vicinity of an igniter of the cylinder type gas generator shown in FIG. 1.
Figure 3:
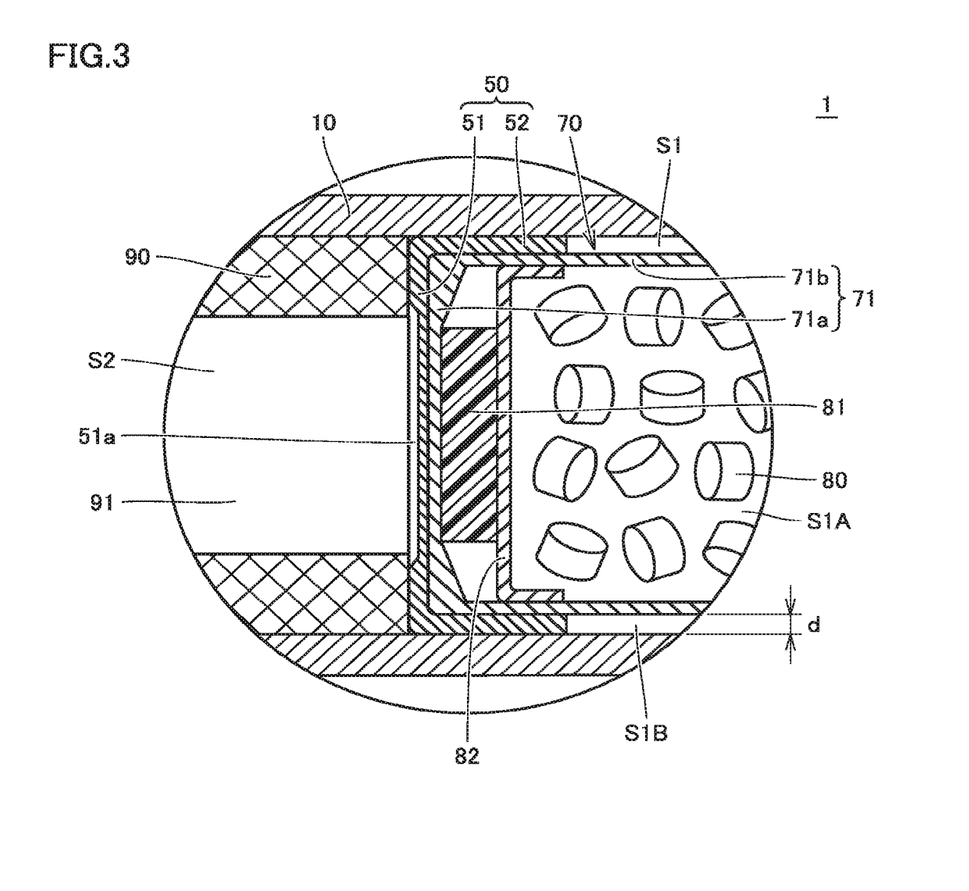
FIG. 3 is an enlarged cross-sectional view of a portion in the vicinity of a partition member of the cylinder type gas generator shown in FIG. 1.

FIG. 1 is a schematic diagram of a cylinder type gas generator in an embodiment of the present invention. FIGS. 2 and 3 are an enlarged cross-sectional view of a portion in the vicinity of an igniter and an enlarged cross-sectional view of a portion in the vicinity of a partition member, of the cylinder type gas generator shown in FIG. 1, respectively. A construction of a cylinder type gas generator 1 in the present embodiment will initially be described with reference to FIGS. 1 to 3.

As shown in FIG. 1, cylinder type gas generator 1 in the present embodiment has an elongated columnar outer geometry and has an elongated cylindrical housing having closed one and the other end portions located in an axial direction. The housing includes a housing main body 10, a holder 20, and a closing member 30.

An igniter 40, a partition member 50, a coil spring 60, a gastight container 70, a gas generating agent 80, an autoignition agent 81, a division member 82, a coil spring 83, and a filter 90 as internal components are accommodated in the housing constituted of housing main body 10, holder 20, and closing member 30. In the housing, a combustion chamber S1 where gas generating agent 80 among the internal components described above is mainly arranged and a filter chamber S2 where filter 90 is arranged are located.

Housing main body 10 is made of an elongated cylindrical member which implements a circumferential wall portion of the housing and has an opening provided at each of opposing ends in the axial direction. Holder 20 is formed from a cylindrical member including a through portion 21 which extends in a direction the same as the axial direction of housing main body 10, and includes in its outer circumferential surface, an annular groove portion 22 for fixing by swaging which will be described later. Closing member 30 is formed from a member in a shape of a disc having a prescribed thickness and includes in its circumferential surface, an annular groove portion 31 for fixing by swaging which will be described later. Annular groove portions 22 and 31 for fixing by swaging are provided in the outer circumferential surface of holder 20 and the circumferential surface of closing member 30, respectively, as extending in the circumferential direction.

Housing main body 10 may be formed from a member made of a metal such as stainless steel, iron steel, an aluminum alloy, or a stainless alloy or from a cylindrically formed press-formed product by press-working of a rolled steel plate represented by SPCE. Alternatively, housing main body 10 may be formed from an electric resistance welded tube represented by STKM.

In particular, when housing main body 10 is formed from a press-formed product of a rolled steel plate or an electric resistance welded tube, housing main body 10 can be formed more inexpensively and readily and with much lighter weight than when the housing main body is formed from a member made of a metal such as stainless steel or iron steel.

Holder 20 and closing member 30 are formed from a member made of a metal such as stainless steel, iron steel, an aluminum alloy, or a stainless alloy.

Holder 20 is fixed to housing main body 10 so as to close one axial opening end of housing main body 10. Specifically, while holder 20 is inserted in one opening end of housing main body 10, housing main body 10 in a portion corresponding to annular groove portion 22 provided in the outer circumferential surface of holder 20 is engaged with annular groove portion 22 as being decreased in diameter radially inward, so that holder 20 is fixed by swaging to housing main body 10. Thus, one axial end portion of the housing is implemented by holder 20.

Closing member 30 is fixed to housing main body 10 so as to close the other axial opening end of housing main body 10. Specifically, while closing member 30 is inserted in the other opening end of housing main body 10, housing main body 10 in a portion corresponding to annular groove portion 31 provided in the circumferential surface of closing member 30 is engaged with annular groove portion 31 as being decreased in diameter radially inward so that closing member 30 is fixed by swaging to housing main body 10. The other axial end portion of the housing is thus implemented by closing member 30.

Such fixing by swaging is called omnidirectional swaging in which housing main body 10 is substantially uniformly decreased in diameter radially inward. With such omnidirectional swaging, swaging portions 12 and 13 are provided in housing main body 10. Swaging portions 12 and 13 are thus in direct contact with annular groove portions 22 and 31, respectively, so that a gap is prevented from being provided therebetween.

A structure for assembly of holder 20 and closing member 30 to housing main body 10 is not limited to the assembly structure described above, and another assembly structure may be adopted. Alternatively, housing main body 10 and closing member 30 do not have to be separate members, and they may be implemented as one member in a shape of a cylinder with bottom.

As shown in FIGS. 1 and 2, igniter 40 is assembled to above-described one axial end portion of the housing by being supported by holder 20. Igniter 40 serves to burn gas generating agent 80 and is set to face a space in the housing.

Igniter 40 includes an ignition portion 41 and a pair of terminal pins 42. In ignition portion 41, a resistor (bridge wire) is attached to be connected to the pair of terminal pins 42, and an ignition agent is loaded in ignition portion 41 so as to surround the resistor or to be in contact with the resistor. An enhancer agent may be loaded in ignition portion 41 as necessary.

Here, a Nichrome wire or a resistance wire made of an alloy containing platinum and tungsten is generally used as a resistor, and ZPP (zirconium potassium perchlorate), ZWPP (zirconium tungsten potassium perchlorate), lead tricinate, or the like is generally made use of as the ignition agent. A composition composed of metal powders/oxidizing agent represented by $B/KNO_3$, $B/NaNO_3$, or $Sr(NO_3)_2$, a composition composed of titanium hydride/potassium perchlorate, or a composition composed of B/5-aminotetrazole/potassium nitrate/molybdenum trioxide is employed as the enhancer agent. A squib cup defining an outer surface of ignition portion 41 is generally made of a metal or plastic.

Upon sensing collision, a prescribed amount of current flows in a resistor through terminal pin 42. As the prescribed amount of current flows in the resistor, Joule heat is generated in the resistor and the ignition agent starts burning. Thermal particles at a high temperature caused by burning burst a squib cup accommodating the ignition agent. A time period from flow of a current in the resistor until activation of igniter 40 is generally not longer than 2 milliseconds in a case that the Nichrome wire is employed as the resistor.

A combustion control cover 43 in a substantially cylindrical shape made of a metal is externally attached to ignition portion 41 of igniter 40. Combustion control cover 43 serves to efficiently guide thermal particles generated in igniter 40 at the time of activation to gas generating agent 80, and more specifically, it gives directivity to a direction of travel of thermal particles generated in ignition portion 41 of igniter 40.

Specifically, ignition portion 41 is surrounded by combustion control cover 43, so that an opening is provided mainly at a tip end portion located on a side of gas generating agent 80 of a squib cup defining an outer surface of ignition portion 41 when the squib cup bursts. Accordingly, a direction of travel of thermal particles generated in ignition portion 41 is narrowed to the axial direction of housing main body 10.

Therefore, by providing combustion control cover 43 as described above, thermal particles generated in igniter 40 can efficiently be guided to gas generating agent 80.

Igniter 40 and combustion control cover 43 are fixed to holder 20 by a swaging portion 23 provided in holder 20. More specifically, holder 20 includes swaging portion 23 for fixing by swaging of igniter 40 and combustion control cover 43 at the axial end portion which faces a space in the housing. Swaging portion 23 described above is swaged while igniter 40 to which combustion control cover 43 is attached is inserted in through portion 21 and abuts on a wall portion in a portion defining through portion 21 of holder 20, so that igniter 40 and combustion control cover 43 are fixed to holder 20 as being held by holder 20.

A depression portion 24 continuous to through portion 21 described above is provided at the axial end portion of holder 20 exposed to the outside. Depression portion 24 provides a female connector portion which receives a male connector (not shown) of a harness for connecting igniter 40 and a control unit (not shown) to each other, and a portion close to a tip end of terminal pin 42 of igniter 40 is located as being exposed in depression portion 24. A male connector is inserted in depression portion 24 serving as the female connector portion so that electrical conduction between a core of the harness and terminal pin 42 is achieved.

As shown in FIGS. 1 and 3, partition member 50 is arranged at a prescribed position in the space in the housing. Partition member 50 is a member for partitioning the space in the housing into combustion chamber S1 and filter chamber S2 in the axial direction.

Partition member 50 is in a shape of a cylinder with bottom, and formed from a member made of a metal such as stainless steel, iron steel, an aluminum alloy, or a stainless alloy. Partition member 50 includes a separation wall portion 51 in a form of a flat plate arranged to be orthogonal to the axial direction of housing main body 10 and an annular wall portion 52 in a form of a cylindrical wall erected from a circumferential edge of separation wall portion 51. Partition member 50 is arranged such that a main surface on an outer side of separation wall portion 51 abuts on filter 90 and an outer circumferential surface of annular wall portion 52 abuts on an inner circumferential surface of housing main body 10.

A score 51a is provided in a main surface of separation wall portion 51 which abuts on filter 90. Score 51a serves to provide an opening as a result of cleavage of separation wall portion 51 with increase in internal pressure in combustion chamber S1 as a result of burning of gas generating agent 80, and it is provided, for example, as a plurality of grooves provided to radially intersect with one another. Score 51a is provided in a portion in filter 90 opposed to a hollow portion 91.

As shown in FIGS. 1 to 3, in a space (that is, combustion chamber S1) lying between holder 20 and partition member 50 in the space in the housing, coil spring 60 and gastight container 70 are arranged. In a gas generating agent accommodation chamber S1A which is a space in gastight container 70, gas generating agent 80, autoignition agent 81, division member 82, and coil spring 83 are accommodated.

Gastight container 70 serves to seal gas generating agent 80 accommodated therein, and it is formed from a weak member which melts or bursts with heat or a pressure generated by activation of igniter 40. Gastight container 70 is in a substantially cylindrical shape having opposing ends closed and arranged substantially coaxially with the housing.

More specifically, gastight container 70 includes a cup body 71 and a cover body 72, and gas generating agent accommodation chamber S1A described above is defined in gastight container 70 by joining cup body 71 and cover body 72 to each other.

Cup body 71 includes a top wall portion 71a in a form of a flat plate and a cylindrical sidewall portion 71b which extends from a circumferential edge of top wall portion 71a. Cover body 72 includes a bottom portion 72a in a form of a flat plate located in cup body 71 by being inserted in an opening end 71b1 of cup body 71 and a fold-over portion 72b which extends from a circumferential edge of bottom portion 72a and is partly curved to cover an inner circumferential surface, an end surface, and an outer circumferential surface of opening end 71b1 of cup body 71. Gas generating agent accommodation chamber S1A described above is mainly defined by top wall portion 71a and sidewall portion 71b of cup body 71 and bottom portion 72a of cover body 72.

Fold-over portion 72b provided to cover opening end 71b1 of cup body 71 is provided with a first swaging portion 72b1 and a second swaging portion 72b2 (see FIG. 4) so that cover body 72 is fixed to cup body 71. Details of a construction of a joint portion implemented by opening end 71b1 and fold-over portion 72b will be described later.

Gastight container 70 is inserted in housing main body 10 such that top wall portion 71a of cup body 71 is located on a side of partition member 50 and bottom portion 72a of cover body 72 is located on a side of holder 20. Bottom portion 72a of cover body 72 thus faces ignition portion 41 of igniter 40.

More specifically, the end portion of gastight container 70 on a side where top wall portion 71a is located is fitted into partition member 50 by being inserted into the inside of partition member 50 and an end portion on a side where bottom portion 72a of gastight container 70 is located is loosely fitted to housing main body 10. Gastight container 70 is thus fixed as being positioned with respect to housing main body 10 and arranged at a prescribed distance from an inner circumferential surface of housing main body 10.

Therefore, a heat insulating layer S1B which is a space of a prescribed size is provided between housing main body 10 forming the circumferential wall portion of the housing and sidewall portion 71b of gastight container 70, and heat insulating layer S1B extends substantially cylindrically along the axial direction of combustion chamber S1. Functions of heat insulating layer S1B will be described later.

In gas generating agent accommodation chamber S1A provided in gastight container 70, autoignition agent 81 and division member 82 are arranged at the end portion on the side of partition member 50 and coil spring 83 is arranged at the end portion on the side of holder 20. Gas generating agent 80 is arranged in a portion except for the end portion on the side of partition member 50 and the end portion on the side of holder 20 in gas generating agent accommodation chamber S1A provided in gastight container 70.

Division member 82 is a member for dividing gas generating agent accommodation chamber S1A in the axial direction and formed from a relatively weak member so as to burst or melt with burning of gas generating agent 80 at the time of activation. The division member is formed from a member in a shape of a cup made from a press-formed product made of a metal such as copper, aluminum, a copper alloy, an aluminum alloy, or the like, or a resin molding formed by injection molding or sheet forming.

Division member 82 is located as being in contact with both of gas generating agent 80 and autoignition agent 81 and as being held thereby. An outer circumferential surface of division member 82 preferably abuts on sidewall portion 71b of gastight container 70.

Gas generating agent 80 is an agent which is ignited by thermal particles generated as a result of activation of igniter 40 and produces gas as it burns. A non-azide-based gas generating agent is preferably employed as gas generating agent 80, and gas generating agent 80 is formed as a molding generally containing a fuel, an oxidizing agent, and an additive.

For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of.

As the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of.

As the additive, a binder, a slag formation agent, a combustion modifier, or the like is exemplified. As the binder, for example, an organic binder such as metal salt of carboxymethyl cellulose and stearate, or an inorganic binder such as synthetic hydrotalcite and Japanese acid clay can suitably be made use of. As the slag formation agent, silicon nitride, silica, Japanese acid clay, or the like can suitably be made use of. As the combustion modifier, a metal oxide, ferrosilicon, activated carbon, graphite, or the like can suitably be made use of.

A shape of a molding of gas generating agent 80 includes various shapes such as a particulate shape including a granule, a pellet, and a column, and a disc shape. Among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which cylinder type gas generator 1 is incorporated, and for example, a shape optimal for the specifications is preferably selected by selecting a shape allowing change over time of a rate of generation of gas during burning of gas generating agent 80. Furthermore, in addition to a shape of gas generating agent 80, a size of a molding or an amount thereof for filling is preferably selected as appropriate, in consideration of a linear burning velocity, a pressure exponent, or the like of gas generating agent 80.

Autoignition agent 81 is an agent which self-ignites without depending on activation of igniter 40, and arranged to abut on top wall portion 71*a* of gastight container 70. More specifically, autoignition agent 81 is made of pellets formed in a columnar shape of a flat profile and comes in contact with top wall portion 71*a* of gastight container 70 and division member 82 as being held by top wall portion 71*a* and division member 82.

Autoignition agent 81 is an agent lower in spontaneous combustion temperature than gas generating agent 80, and it serves not to induce an abnormal operation due to external heating of cylinder type gas generator 1 in case of fire in a vehicle equipped with an air bag apparatus incorporating cylinder type gas generator 1.

Coil spring 83 is provided for the purpose of preventing gas generating agent 80 made of a molding from being crushed by vibration or the like, and has a spring portion 83*a* formed by bending a metal wire rod and a pressing portion 83*b*. Spring portion 83*a* is arranged such that one end thereof abuts on bottom portion 72*a* of gastight container 70 and pressing portion 83*b* is formed at the other end. Pressing portion 83*b* is provided by arranging, for example, metal wire rods substantially in parallel to each other at a prescribed interval, and abuts on gas generating agent 80.

Thus, gas generating agent 80 is elastically biased toward partition member 50 by coil spring 83 and prevented from moving in gastight container 70. Instead of coil spring 83 as described above, a cushion material formed from a member made, for example, of a molding of ceramic fibers, rock wool, a foamed resin (such as foamed silicone, foamed polypropylene, or foamed polyethylene), or rubber represented by chloroprene and EPDM may be made use of.

In a space in combustion chamber S1 located on the side of holder 20 relative to gastight container 70, coil spring 60 representing an elastic body which is a component different from coil spring 83 described above is arranged. Coil spring 60 is a member for accommodating dimension variation among various constituent components accommodated in the housing, and unlike coil spring 83, it is formed from a general spring member without pressing portion 83*b* as provided in coil spring 83.

More specifically, coil spring 60 is arranged such that one end thereof abuts on holder 20 and the other end abuts on a tip end of fold-over portion 72*b* located at the end portion of gastight container 70 on the side of holder 20. Gastight container 70 is thus elastically biased toward partition member 50 by coil spring 60 and fixed to the housing by being sandwiched between partition member 50 described above and coil spring 60.

Gastight container 70 may be fixed to the housing by another elastic body such as a cushion material formed from a member made, for example, of a molding of ceramic fibers, rock wool, a foamed resin (such as foamed silicone, foamed polypropylene, or foamed polyethylene), or rubber represented by chloroprene and EPDM instead of coil spring 60 as described above.

As shown in FIG. 1, in the space in the housing, filter 90 is arranged in the space (that is, filter chamber S2) lying between closing member 30 and partition member 50. Filter 90 is formed from a cylindrical member having hollow portion 91 extending in a direction the same as the axial direction of housing main body 10, and has axial one end surface abutting on closing member 30 and axial the other end surface abutting on partition member 50.

Filter 90 functions as cooling means for cooling gas by removing heat from the gas at a high temperature when the gas produced as a result of burning of gas generating agent 80 passes through this filter 90 and also functions as removal means for removing slag (residues) or the like contained in the gas. As described above, by making use of filter 90 formed from a cylindrical member, a flow resistance against gas which flows through filter chamber S2 at the time of activation is suppressed and an efficient flow of the gas can be achieved.

A filter formed from an aggregate of metal wire rods or metal mesh materials suitably made of stainless steel or iron steel can be made use of as filter 90. Specifically, a wire gauze of stocking stitch, a plain-woven wire gauze, an aggregate of crimped metal wire rods, or a material obtained by compressing the former with the use of a press can be made use of.

Alternatively, a material obtained by winding a perforated metal plate can also be made use of as filter 90. In this case, as the perforated metal plate, for example, expanded metal obtained by making staggered cuts in a metal plate and providing holes by widening the cuts to thereby work the metal plate in a mesh, hook metal obtained by perforating a metal plate and collapsing burrs caused around a periphery of the hole for flattening, or the like can be made use of.

A plurality of gas discharge openings 11 are provided along the circumferential direction and the axial direction in housing main body 10 in a portion defining filter chamber S2. The plurality of gas discharge openings 11 serve for guiding gas which has passed through filter 90 to the outside of the housing.

An operation of cylinder type gas generator 1 in the present embodiment when it is activated will now be described with reference to FIG. 1.

With reference to FIG. 1, when a vehicle on which cylinder type gas generator 1 in the present embodiment is mounted collides, collision is sensed by collision sensing means separately provided in the vehicle and igniter 40 is activated based thereon by current feed caused by a control unit separately provided in the vehicle.

When igniter 40 is activated, an ignition agent or an enhancer agent in addition thereto burns. Then, a pressure in ignition portion 41 increases, which bursts ignition portion 41, and thermal particles flow to the outside of ignition portion 41.

Combustion control cover 43 described above provides directivity to thermal particles which flow out of ignition portion 41, so that the thermal particles thus reach bottom portion 72*a* of gastight container 70. Thus, bottom portion 72*a* of gastight container 70 melts or bursts with heat or a pressure generated by activation of igniter 40 and the thermal particles described above reach gas generating agent 80.

The thermal particles which have reached gas generating agent 80 burn gas generating agent 80 so that a large amount of gas is produced. Accordingly, a pressure and a temperature in gas generating agent accommodation chamber S1A increase, sidewall portion 71*b* of gastight container 70 and division member 82 burst or melt and autoignition agent 81 burns, and furthermore top wall portion 71*a* of gastight container 70 bursts or melts.

As gas generating agent 80 burns, a pressure in the entire combustion chamber S1 further increases and an internal pressure in combustion chamber S1 reaches a prescribed pressure. Thus, a portion of partition member 50 where score S1*a* is provided ruptures. Thus, a communication hole is provided in partition member 50 in a portion opposed to hollow portion 91 of filter 90, and combustion chamber S1 and filter chamber S2 communicate with each other through the communication hole.

Accordingly, gas produced in combustion chamber S1 flows into filter chamber S2 through a communication hole provided in partition member 50. The gas which has flowed into filter chamber S2 flows along the axial direction through hollow portion 91 of filter 90, thereafter changes its direction toward a radial direction, and passes through filter 90. At that time, heat is removed through filter 90 and the gas is cooled, and slag contained in the gas is removed by filter 90.

The gas which has passed through filter 90 is discharged to the outside of the housing through gas discharge opening 11. The discharged gas is introduced into an air bag provided adjacently to cylinder type gas generator 1 to thereby expand and develop the air bag.

Figure 4:
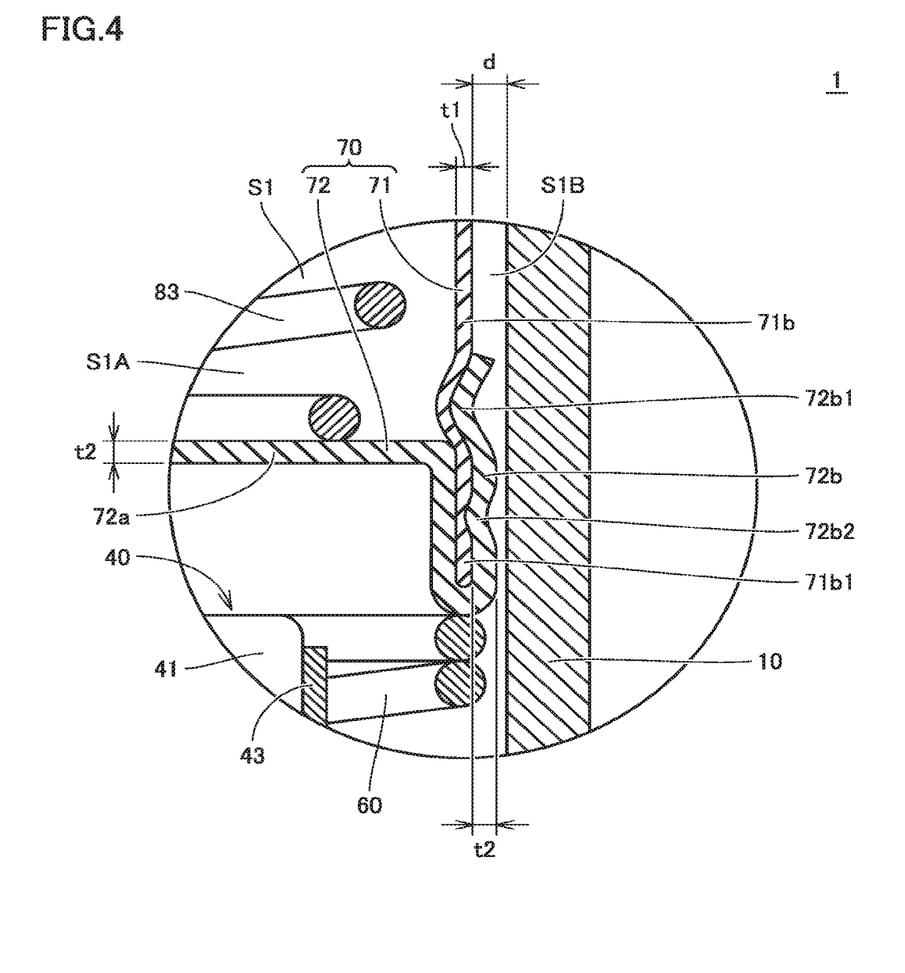
FIG. 4 is an enlarged view of a region IV shown in FIG. 2.

FIG. 4 is an enlarged view of a region IV shown in FIG. 2. A construction of the joint portion of gastight container 70 of cylinder type gas generator 1 described above will now be described in detail with reference to FIG. 4.

As described above, in cylinder type gas generator 1 in the present embodiment, gastight container 70 is constituted of cup body 71 and cover body 72, and opening end 71b1 of cup body 71 is covered with fold-over portion 72b of cover body 72. Therefore, the joint portion is implemented by opening end 71b1 and fold-over portion 72b.

Cup body 71 and cover body 72 are each formed from a weak member which melts or bursts with heat or a pressure generated by activation of igniter 40. More specifically, cover body 72 is formed from a weak member which melts or bursts with heat or a pressure generated by burning of an ignition agent or an enhancer agent in addition thereto in response to activation of igniter 40, and cup body 71 is formed from a weak member which melts or bursts with heat or a pressure generated by burning of gas generating agent 80 brought about by activation of igniter 40.

Specifically, cup body 71 and cover body 72 are each preferably formed from a press-formed product made of a metal such as copper, aluminum, a copper alloy, an aluminum alloy, or the like, and they are joined to each other at the joint portion described above so that gas generating agent 80 accommodated therein is hermetically sealed from the outside.

As shown in FIG. 4, fold-over portion 72b in a portion erected from bottom portion 72a of cover body 72 is located as abutting on the inner circumferential surface of opening end 71b1 of cup body 71 and a fold-back portion curved to cover the end surface of opening end 71b1 of cup body 71 is provided at a tip end of fold-over portion 72b in that portion. Fold-over portion 72b in a portion extending from the fold-back portion is located as abutting on the outer circumferential surface of opening end 71b1 of cup body 71, and the tip end of fold-over portion 72b in that portion reaches sidewall portion 71b of cup body 71 in the portion defining gas generating agent accommodation chamber S1A.

In a portion of fold-over portion 72b which covers the outer circumferential surface of opening end 71b1 of cup body 71 and corresponds to sidewall portion 71b of cup body 71 in the portion defining gas generating agent accommodation chamber S1A at a position adjacent to bottom portion 72a of cover body 72, first swaging portion 72b1 formed by decreasing a diameter of fold-over portion 72b radially inward is located.

In a portion of fold-over portion 72b which covers the outer circumferential surface of opening end 71b1 of cup body 71 and opposed to a portion of fold-over portion 72b which covers the inner circumferential surface of opening end 71b1 of cup body 71, second swaging portion 72b2 formed by decreasing a diameter of fold-over portion 72b radially inward is located.

By thus swaging fold-over portion 72b of cover body 72 at two positions, strength of joint of cover body 72 to cup body 71 is enhanced and performance of sealing of gas generating agent 80 by gastight container 70 can significantly be enhanced with a simplified construction. Therefore, in assembly of gastight container 70 to housing main body 10, the joint portion can be prevented from breaking to such an extent as impairing hermetic sealing of gas generating agent 80 even when external force is applied to the joint portion implemented by opening end 71b1 of cup body 71 and fold-over portion 72b of cover body 72.

In particular, in cylinder type gas generator 1 in the present embodiment, after assembly of gastight container 70 to housing main body 10, one end portion of coil spring 60 is arranged to abut on the tip end of fold-over portion 72b of gastight container 70 (that is, the above-described curved portion of fold-over portion 72b) as described above. In that case as well, break of the joint portion to such an extent as impairing hermetic sealing of gas generating agent 80 can be suppressed.

In cylinder type gas generator 1 in the present embodiment, thicknesses t1 and t2 satisfy a condition of t1<t2 where t1 represents a thickness of a portion defining sidewall portion 71b of cup body 71 and t2 represents a thickness of a portion implementing fold-over portion 72b of cover body 72. Thickness t2 of the portion implementing fold-over portion 72b of cover body 72 is greater than thickness t1 of the portion implementing sidewall portion 71b of cup body 71.

More specifically, thickness t1 of the portion implementing sidewall portion 71b of cup body 71 is set to relatively be small such that the portion reliably melts or bursts with heat or a pressure generated by burning of gas generating agent 80, and it is preferably set, for example, to a thickness not smaller than 0.15 mm and not greater than 0.25 mm. In the present embodiment, thickness t1 is set to 0.20 mm.

Thickness t2 of the portion implementing fold-over portion 72b of cover body 72 is set to relatively be large in consideration of the fact that heat or a pressure generated by burning of an ignition agent or an enhancer agent in addition thereto is directly applied to cover body 72 and cover body 72 relatively easily melts or bursts with the heat or the pressure. On condition that thickness t2 is relatively great and greater than thickness t1, thickness t2 is preferably set, for example, to a thickness not smaller than 0.25 mm and not greater than 0.35 mm. In the present embodiment, thickness t2 is set to 0.30 mm.

Thus, thickness t2 of the portion implementing fold-over portion 72b of cover body 72 to which the heat or the pressure generated by activation of igniter 40 is directly applied is set to be greater than thickness t1 of the portion implementing sidewall portion 71b of cup body 71 to which heat or a pressure generated by activation of igniter 40 is not directly applied but heat or a pressure generated by burning of gas generating agent 80 brought about by activation of igniter 40 is applied, so that rigidity of the joint portion constituted of opening end 71b1 of cup body 71 and fold-over portion 72b of cover body 72 can be enhanced while a reliable operation by cylinder type gas generator 1 is ensured.

Therefore, by adopting such a construction, rigidity of the joint portion is enhanced and strength of joint of cover body 72 to cup body 71 is enhanced so that performance of sealing of gas generating agent 80 by gastight container 70 can significantly be enhanced with a simplified construction. Therefore, in assembly of gastight container 70 to housing main body 10, the joint portion can be prevented from breaking to such an extent as impairing hermetic sealing of gas generating agent 80 even when external force is applied to the joint portion implemented by opening end 71b1 of cup body 71 and fold-over portion 72b of cover body 72.

In particular, in cylinder type gas generator 1 in the present embodiment, after assembly of gastight container 70 to housing main body 10, one end portion of coil spring 60 is arranged to abut on the tip end of fold-over portion 72b of gastight container 70 (that is, the above-described curved portion of fold-over portion 72b) as described above. In that case as well, break of the joint portion to such an extent as impairing hermetic sealing of gas generating agent 80 can be suppressed.

As described above, with cylinder type gas generator 1 in the present embodiment, performance of sealing of gas generating agent 80 by gastight container 70 can significantly be enhanced with a simplified construction and a cylinder type gas generator which can thus obtain desired gas output can be obtained.

In cylinder type gas generator 1 in the present embodiment, cylindrical heat insulating layer S1B is provided between gastight container 70 in which gas generating agent 80 is accommodated and housing main body 10 as described above. According to such a construction, increase in temperature of gas generating agent 80 due to external heating even in case of fire in a vehicle equipped with an air bag apparatus incorporating cylinder type gas generator 1 can effectively be suppressed.

By providing heat insulating layer S1B in a portion radially outside gastight container 70 where gas generating agent 80 is accommodated, heat insulating layer S1B serves as a thermal resistance and heat of housing main body 10 is less likely to conduct to gas generating agent 80, and consequently, increase in temperature of gas generating agent 80 can be suppressed.

Heat insulating layer S1B is preferably lower in thermal conductivity than housing main body 10, and it is provided as an air layer in the present embodiment. Heat insulating layer S1B, however, does not necessarily have to be provided as the air layer, and it may be provided as a gas layer filled with another gas or as a vacuum layer. In addition, heat insulating layer S1B may be provided by arranging various heat insulating members in the space.

Autoignition agent 81 is in thermal contact with housing main body 10 substantially through a shortest path with division member 82 which is a member made of a metal, the end portion close to top wall portion 71a of gastight container 70 which is a member made of a metal, and partition member 50 which is a member made of a metal being interposed. Therefore, autoignition agent 81 is efficiently heated in case of fire.

Cylinder type gas generator 1 in the present embodiment is thus constructed such that external heat is less likely to conduct to gas generating agent 80 but is more likely to conduct to autoignition agent 81.

Therefore, timing of exhibition of an autoignition operation started as a result of spontaneous ignition of autoignition agent 81 in case of fire in a vehicle becomes earlier, and consequently a temperature of gas generating agent 80 at the time when the autoignition operation is exhibited can be suppressed. Therefore, increase in internal pressure in the housing at the time of the autoignition operation can significantly be suppressed.

Thus, not only break of the housing can more reliably be prevented but also a withstanding pressure required of the housing can further be suppressed. Consequently, the housing can be smaller in thickness (in particular, a thickness of housing main body 10) and the cylinder type gas generator can also be reduced in size and weight as compared with the conventional example.

Therefore, by adopting the construction, cylinder type gas generator 1 reduced in size and weight and improved in safety as compared with the conventional example can be obtained.

In order to promote conduction of external heat to autoignition agent 81, preferably, not only the end portion of sidewall portion 71b located on the side of top wall portion 71a of gastight container 70 abuts on annular wall portion 52 of partition member 50 but also an outer surface of top wall portion 71a of gastight container 70 further abuts on separation wall portion 51 of partition member 50 as illustrated.

As shown in FIGS. 1 to 4, in order to provide heat insulating layer S1B in the housing, gastight container 70 should be assembled as being positioned with respect to the housing such that sidewall portion 71b of gastight container 70 is located at a prescribed distance (that is, a distance d shown in FIGS. 3 and 4) from the inner circumferential surface of housing main body 10.

In this connection, positioning above can be made in the present embodiment such that the end portion of gastight container 70 on the side where top wall portion 71a is located is fitted into partition member 50 by being inserted in partition member 50 and the end portion of gastight container 70 on the side where bottom portion 72a is located is loosely fitted into housing main body 10 as described above.

As shown in FIG. 3, by setting a thickness of annular wall portion 52 of partition member 50 to be equal to distance d, sidewall portion 71b of gastight container 70 is located at distance d from the inner circumferential surface of housing main body 10 at the end portion of gastight container 70 on the side where top wall portion 71a is located and the vicinity thereof.

As shown in FIG. 4, the end portion of gastight container 70 on the side where bottom portion 72a is located does not abut on the inner circumferential surface of housing main body 10, however, the end portion of gastight container 70 on the side where bottom portion 72a is located is located as being closer to the inner circumferential surface of housing main body 10 by thickness t2 of fold-over portion 72b in its portion which covers the outer circumferential surface of opening end 71b1 of cup body 71.

Therefore, only by loosely fitting the end portion of gastight container 70 in the portion including fold-over portion 72b into housing main body 10 as described above as well, sidewall portion 71b of gastight container 70 can be arranged as being distant approximately by distance d from the inner circumferential surface of housing main body 10 in the vicinity of the end portion of gastight container 70 on the side where bottom portion 72a is located.

By setting thickness t2 of the portion implementing fold-over portion 72b of cover body 72 to be greater than thickness t1 of the portion implementing sidewall portion 71b of cup body 71 as described above, a size of a gap (what is called a play) between the end portion of gastight container 70 in the portion including fold-over portion 72b and housing main body 10 is made smaller by thickness t2, so that a higher effect of positioning described above can be obtained.

As described above, by providing second swaging portion 72b2 in the portion of fold-over portion 72b which covers the outer circumferential surface of opening end 71b1 of cup body 71 and is opposed to the portion of fold-over portion 72b which covers the inner circumferential surface of opening end 71b1 of cup body 71, fold-over portion 72b in a portion adjacent to second swaging portion 72b2 projects outward due to application of a pressure in swaging, although the extent thereof is minor. The size of the gap (what is called a play) described above is made smaller by that amount, and the higher effect of positioning described above can be obtained also in this aspect.

Therefore, by adopting the construction, without arranging a spacer member like partition member 50 at the end portion of gastight container 70 on the side of igniter 40, heat insulating layer S1B of a prescribed size can reliably be provided in the housing and the number of components as well as a size and a weight of the cylinder type gas generator can be reduced.

In cylinder type gas generator 1 in the present embodiment, the construction is not such that a sealing material such as an O ring is provided somewhere on the housing so as to hermetically seal combustion chamber S1 itself from the outside but such that gastight container 70 provided in combustion chamber S1 independently hermetically seals from the outside, gas generating agent accommodation chamber S1A where gas generating agent 80 is arranged. Therefore, no hole is provided in gastight container 70.

Therefore, cylinder type gas generator 1 in the present embodiment is different in construction from what is called a dual-wall cylinder type gas generator in which a cylindrical body provided with holes in a circumferential wall is coaxially laid over a housing.

Though an example in which the present invention is applied to the cylinder type gas generator constructed to provide a heat insulating layer in the housing radially outside of the gastight container is illustrated and described in the embodiment of the present invention described above, the heat insulating layer is not necessarily an essential component. The present invention can naturally be applied also to a cylinder type gas generator without a heat insulating layer as described above, and in that case, the sidewall portion of the gastight container abuts on the inner circumferential surface of the housing main body by press-fitting the gastight container into the housing main body.

Though an example in which the present invention is applied to the cylinder type gas generator in which not only the gas generating agent but also the autoignition agent, the partition member, and the coil spring are accommodated in the gastight container is illustrated and described in the embodiment of the present invention described above, the construction does not necessarily have to be as such, and at least a gas generating agent should only be accommodated in the gastight container.

Though an example in which only an ignition agent is loaded or an ignition agent and an enhancer agent are loaded in the ignition portion of the igniter is illustrated and described in the embodiment of the present invention described above, the enhancer agent does not necessarily have to be loaded in the ignition portion of the igniter if it is loaded, and the enhancer agent may be loaded at a position between the ignition portion of the igniter and the gas generating agent, for example, by using a cup-shaped member or a container.

In addition, though an example in which the present invention is applied to a cylinder type gas generator incorporated in a side air bag apparatus is illustrated and described in the embodiment of the present invention described above, applications of the present invention are not limited thereto and the present invention can be applied also to a cylinder type gas generator incorporated in a curtain air bag apparatus, a knee air bag apparatus, or a seat cushion air bag apparatus or what is called a T-shaped gas generator having an elongated outer geometry similarly to the cylinder type gas generator.

The embodiment disclosed herein is thus illustrative and non-restrictive in every respect. The technical scope of the present invention is delimited by the terms of the claims, and includes any modifications within the scope and meaning equivalent to the terms of the claims.

REFERENCE SIGNS LIST 1 cylinder type gas generator; 10 housing main body; 11 gas discharge opening; 12, 13 swaging portion; 20 holder; 21 through portion; 22 annular groove portion; 23 swaging portion; 24 depression portion; 30 closing member; 31 annular groove portion; 40 igniter; 41 ignition portion; 42 terminal pin; 43 combustion control cover; 50 partition member; 51 separation wall portion; 51a score; 52 annular wall portion; 60 coil spring; 70 gastight container; 71 cup body; 71a top wall portion; 71b sidewall portion; 71b1 opening end; 72 cover body; 72a bottom portion; 72b fold-over portion; 72b1 first swaging portion; 72b2 second swaging portion; 80 gas generating agent; 81 autoignition agent; 82 division member; 83 coil spring; 83a spring portion; 83b pressing portion; 90 filter; 91 hollow portion; S1 combustion chamber; S1A gas generating agent accommodation chamber; S1B heat insulating layer; and S2 filter chamber

The invention claimed is:

1. A gas generator comprising:
an elongated cylindrical housing having a closed one axial end portion and a closed other axial end portion, and further having a circumferential wall portion;
a gas generating agent accommodated in the housing;
an igniter assembled to the one axial end portion of the housing, the igniter serving to burn the gas generating agent; and
a gastight container arranged in the housing, the gastight container defining a gas generating agent accommodation chamber where the gas generating agent is accommodated, the gastight container melting or bursting with heat or a pressure generated by activation of the igniter,
the gastight container including a cup body and a cover body, the cup body including a cylindrical sidewall portion arranged substantially coaxially with the housing and a top wall portion which closes one axial end portion of the sidewall portion, the cover body being attached to an opening end which is the other axial end portion of the cup body,
the cover body including
a bottom portion in a form of a flat plate, the bottom portion being located in the cup body by being inserted the opening end of the cup body and defining the gas generating agent accommodation chamber together with the cup body, and
a fold-over portion, the fold-over portion extending from a circumferential edge of the bottom portion and being at least partly curved to cover an inner circumferential surface, an end surface, and an outer circumferential surface of the opening end of the cup body, the gastight container being accommodated in the housing such da the bottom portion of the cover body faces the igniter, the cover body being fixed to the cup body by providing, in a portion of the fold-over portion which covers the outer circumferential surface of the opening end of the cup body, a first swaging portion formed by decreasing a diameter of the fold-over portion radially inward and a second swaging portion formed by decreasing a diameter of the fold-over portion radially inward, the first swaging portion being provided m a portion of the fold-over portion which corresponds to the sidewall portion of the cup body and defines the gas generating agent accommodation chamber at a position adjacent to the bottom portion, the second swaging portion being provided in a portion of the fold-over portion which is opposed to a portion of the fold-over portion which covers the inner circumferential surface of the opening end of the cup body, wherein:

a filter through which gas generated as a result of burning of the gas generating agent passes is provided in the housing, a partition member partitions a space in the housing in an axial direction such that a combustion chamber where the gastight container is accommodated is located on a side of the one axial end portion of the housing and a filter chamber where the filter is accommodated is located on a side of de other axial end portion of the housing, a gas discharge opening for emitting the gas to outside is provided in the circumferential wall portion of the housing in a portion defining the filter chamber, a heat insulating gas layer is provided between the circumferential wall portion of the housing and the sidewall portion of the cup body, the portion of the fold-over portion that covers the outer circumferential surface of the cup body is provided such that the sidewall portion of the cup body is arranged at a distance from the circumferential wall portion of the housing, and the second swaging portion is provided in the fold-over portion so that a part of the fold-over portion adjacent to the second swaging portion projects towards the circumferential wall portion of the housing.

2. The gas generator according to claim 1, wherein the gastight container is biased toward the partition member by arranging an elastic body as abutting on the one axial end portion of the housing and the fold-over portion of the cover body.

3. The gas generator according to claim 2, wherein the elastic body is a coil spring.

4. The gas generator according to claim 1, wherein a portion forming the fold-over portion of the cover body is greater in thickness than a portion forming the sidewall portion of the cup body.

* * * * *